US012681738B2

(12) United States Patent
Liu

(10) Patent No.: US 12,681,738 B2
(45) Date of Patent: Jul. 14, 2026

(54) SCREEN CAPTURE METHOD AND APPARATUS, ELECTRONIC DEVICE, AND READABLE STORAGE MEDIUM

(71) Applicant: VIVO MOBILE COMMUNICATION CO., LTD., Dongguan (CN)

(72) Inventor: Shaoling Liu, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 277 days.

(21) Appl. No.: 18/368,826

(22) Filed: Sep. 15, 2023

(65) Prior Publication Data

US 2024/0004676 A1 Jan. 4, 2024

Related U.S. Application Data

(63) Continuation of application No. PCT/CN2022/079928, filed on Mar. 9, 2022.

(30) Foreign Application Priority Data

Mar. 15, 2021 (CN) .......................... 202110277990.3

(51) Int. Cl.
*G06F 9/451* (2018.01)
*G06F 3/04845* (2022.01)

(52) U.S. Cl.
CPC .......... *G06F 9/451* (2018.02); *G06F 3/04845* (2013.01)

(58) Field of Classification Search
CPC .. G06F 9/451; G06F 3/04845; G06F 3/04842; G06F 3/0488; G06F 3/04883
See application file for complete search history.

(56) References Cited

U.S. PATENT DOCUMENTS 8,566,742 B2 10/2013 Keereepart et al.
2012/0284658 A1* 11/2012 Hirvonen .............. G06F 3/0488
715/779

(Continued)

FOREIGN PATENT DOCUMENTS

CN 104102421 A 10/2014
CN 108121583 A 6/2018
(Continued)

OTHER PUBLICATIONS

Techsmith: Snagit 11 Snagit 11.4 Help; Retrieved from the internet: URL: https://assets.techsmith.com/Downloads/ua-tutorials-snagit-11/Snagit_11.pdf, dated Jan. 2014 and archived at archive.org as of Aug. 17, 2016 (Year: 2016).*

*Primary Examiner* — William A Beutel

(74) *Attorney, Agent, or Firm* — The Webb Law Firm

(57) ABSTRACT

A screen capture method includes receiving a screen capture input for a target interface; in response to the screen capture input, determining a target screen corresponding to a target screen capture parameter and displaying interface elements of the target interface on the target screen according to a target policy, where the target screen capture parameter is determined according to the screen capture input, and the target policy is a preset display policy for the target interface; and performing a screen capture operation on the target screen to obtain a first image; where the target screen capture parameter is resolution or size, and a display parameter of the first image is the same as the target screen capture parameter.

13 Claims, 10 Drawing Sheets

(56) References Cited

U.S. PATENT DOCUMENTS

| | | | |
|---|---|---|---|
| 2014/0032735 A1 | 1/2014 | Kapoor | |
| 2015/0277571 A1* | 10/2015 | Landau | G06F 3/04842 |
| | | | 715/863 |
| 2019/0361593 A1* | 11/2019 | Huang | G06F 21/60 |
| 2020/0151345 A1 | 5/2020 | Chauhan | |
| 2021/0406673 A1* | 12/2021 | Pardeshi | G06F 8/76 |

FOREIGN PATENT DOCUMENTS

| | | | |
|---|---|---|---|
| CN | 109683756 A | 4/2019 | |
| CN | 113126862 A | 7/2021 | |
| EP | 3382506 A1 | 10/2018 | |

* cited by examiner

40

42

90

SCREEN CAPTURE METHOD AND APPARATUS, ELECTRONIC DEVICE, AND READABLE STORAGE MEDIUM

CROSS-REFERENCE TO RELATED APPLICATIONS

This application is a Bypass Continuation Application of International Patent Application No. PCT/CN2022/079928, filed Mar. 9, 2022, and claims priority to Chinese Patent Application No. 202110277990.3, filed Mar. 15, 2021, the disclosures of which are hereby incorporated by reference in their entireties.

BACKGROUND OF THE INVENTION

Field of the Invention

This application pertains to the field of communication technologies and relates to a screen capture method and apparatus, an electronic device, and a non-transitory readable storage medium.

Description of Related Art

With the development of electronic technologies, electronic devices are becoming more and more functional. For example, an electronic device can capture an application interface displayed on it, so as to obtain a screen capture image of the application interface.

SUMMARY OF THE INVENTION

Embodiments of this application provide a screen capture method and apparatus, an electronic device, and a non-transitory readable storage medium.

According to a first aspect, an embodiment of this application provides a screen capture method. The method includes: receiving a screen capture input for a target interface; in response to the screen capture input, determining a target screen corresponding to a target screen capture parameter and displaying interface elements of the target interface on the target screen according to a target policy, where the target screen capture parameter is determined according to the screen capture input, and the target policy is a preset display policy for the target interface; and performing a screen capture operation on the target screen to obtain a first image; where the target screen capture parameter is resolution or size, and a display parameter of the first image is the same as the target screen capture parameter.

According to a second aspect, an embodiment of this application provides a screen capture apparatus, where the apparatus may include a receiving module, a determining module, a display module, and a screen capture module. The receiving module is configured to receive a screen capture input for a target interface. The determining module is configured to determine, in response to the screen capture input received by the receiving module, a target screen corresponding to a target screen capture parameter. The display module is configured to display, according to a target policy, interface elements of the target interface on the target screen determined by the determining module, where the target screen capture parameter is determined according to the screen capture input, and the target policy is a preset display policy for the target interface. The screen capture module is further configured to perform a screen capture operation on the target screen to obtain a first image; where the target screen capture parameter is resolution or size, and a display parameter of the first image is the same as the target screen capture parameter.

According to a third aspect, an embodiment of this application provides an electronic device. The electronic device includes a processor, a memory, and a program or instructions stored in the memory and executable on the processor, where when the program or instructions are executed by the processor, the steps of the method according to the first aspect are implemented.

According to a fourth aspect, an embodiment of this application provides a non-transitory readable storage medium, where the non-transitory readable storage medium stores a program or instructions, and when the program or instructions are executed by a processor, the steps of the method according to the first aspect are implemented.

According to a fifth aspect, an embodiment of this application provides a chip, where the chip includes a processor and a communication interface, the communication interface is coupled to the processor, and the processor is configured to run a program or instructions to implement the method according to the first aspect.

DESCRIPTION OF THE INVENTION

Figure 1:
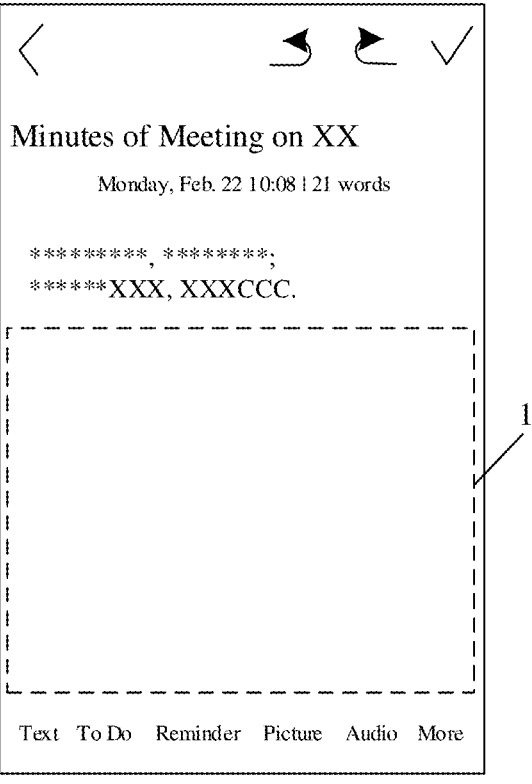
FIG. 1 is a schematic diagram of a screen capture image of an interface obtained in the prior art.

The following clearly describes the technical solutions in the embodiments of this application with reference to the accompanying drawings in the embodiments of this application. Apparently, the described embodiments are only some rather than all of the embodiments of this application.

The terms "first", "second", and the like in this specification and claims of this application are used to distinguish between similar objects rather than to describe a specific order or sequence. It should be understood that the terms used in this way is interchangeable in appropriate circumstances such that the embodiments of this application can be implemented in other orders than the order illustrated or described herein. In addition, "and/or" in the specification and claims represents at least one of connected objects, and the character "I" generally indicates that the associated objects have an "or" relationship.

It should be noted that the signs in the embodiments of this application may be used to indicate text, symbols, images, and the like in the information, and may use controls or other containers as carriers for displaying the information, including but not limited to textual signs, symbolic signs, and image signs.

Optionally, when an electronic device takes a screen capture of an application interface, the electronic device can capture the entire screen area of the electronic device to obtain a screen capture image, and then a user can trigger the electronic device to adjust the screen capture image, for example, to stretch or compress the screen capture image, such that the aspect ratio of the adjusted screen capture image meets the screen capture needs of the user. However, the adjustment operation such as stretching or compressing the screen capture image may cause the content of the screen capture image to be distorted, which results in a poor display effect of the adjusted screen capture image.

The screen capture method and apparatus and electronic device provided in the embodiments of this application are hereinafter described by using some embodiments and application scenarios thereof with reference to the accompanying drawings.

The screen capture method provided in the embodiments of this application can be applied to a scenario where an electronic device is used to capture the screen of an application interface.

Currently, when capturing the screen of an application interface (hereinafter referred to as interface 1), the electronic device can perform a screen capture operation on the entire screen displaying interface 1, such that the aspect ratio of the screen capture image is the same as the aspect ratio of the screen of the electronic device. Thus, if the aspect ratio of the screen capture image is different from the aspect ratio required by a user, the user can trigger the electronic device to adjust the screen capture image by stretching, compressing, or cropping the screen capture image, such that the aspect ratio of the adjusted screen capture image meets the user needs.

For example, assuming that the screen of the electronic device has an aspect ratio of 9:16, but the user needs to use the image to create a slideshow with an aspect ratio of 4:3, the user may first trigger the electronic device to obtain a screen capture image of interface 1, and then the user may trigger the electronic device to crop the edges of the screen capture image. Apparently, this results in the cropped screen capture image including only part of interface 1. For example, the edge area of interface 1 will be cropped off, thus resulting in a poor display effect of the screen capture image.

For another example, actual content areas of some interfaces are only located at the top and bottom areas of the screen, and there is a large blank area in the middle, so the screen capture image obtained after the electronic device captures the interface screen also has a large blank area in the middle, which makes the content of the screen capture image display incoherently, and the content is not concentrated enough, resulting in a poor display effect, for example, middle area 1 in the screen capture image shown in FIG. 1.

In the embodiments of this application, when a user needs to obtain a screen capture image of an application interface (hereinafter referred to as interface 1), the user can perform a screen capture input on interface 1 to trigger and determine a screen corresponding to a screen capture parameter (target screen capture parameter) specified by the user (to be specific, the aspect ratio of that screen is the same as the aspect ratio corresponding to the screen capture parameter) and to display interface 1 on the screen according to a target policy, and then perform a screen capture operation on the screen. This can not only ensure that the screen capture image obtained includes the complete content of interface 1 but also meet the aspect ratio requirement of the user.

Figure 2:
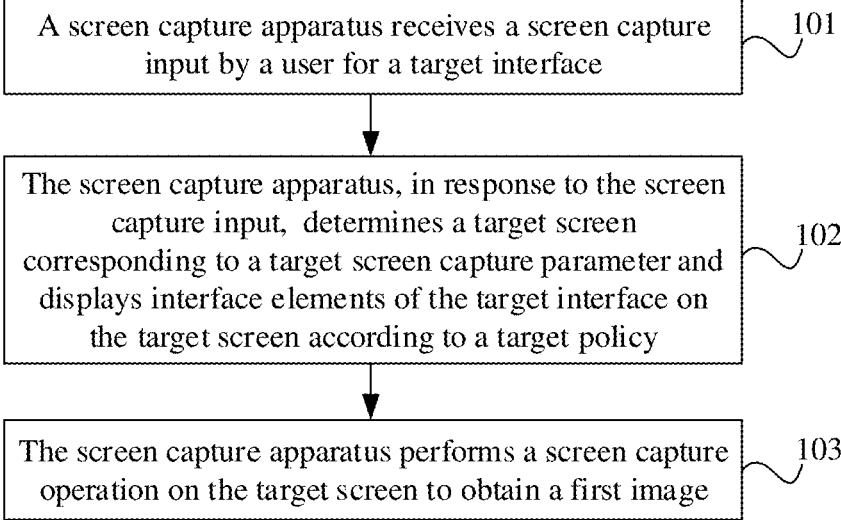
FIG. 2 is a schematic diagram of a screen capture method according to an embodiment of this application.

An embodiment of this application provides a screen capture method. As shown in FIG. 2, the method may include the following steps 101 to 103. The method is exemplarily illustrated below with a screen capture apparatus being the execution subject.

Step 101: The screen capture apparatus receives a screen capture input by a user for a target interface.

Optionally, in an embodiment of this application, the screen capture input may be a touch input for the target interface or a screen capture control, a gesture input for triggering a screen capture, or an input through a key/key combination on the electronic device for triggering a screen capture. The screen capture input may be based on actual use requirement, and is not limited in the embodiments of this application.

Optionally, in an embodiment of this application, the target interface may be an interface of a target application, and the target application may be an interface of any application installed on the electronic device.

Step 102: The screen capture apparatus, in response to the screen capture input, determines a target screen corresponding to a target screen capture parameter and displays interface elements of the target interface on the target screen according to a target policy.

The target screen capture parameter is determined according to the screen capture input, for example, the target screen capture parameter may be entered by the user via the screen capture input. The target policy is a predetermined policy for updating the interface elements of the target interface.

Optionally, in an embodiment of this application, the target screen capture parameter may be resolution or size.

Resolution, as used in an embodiment of this application, refers to the numbers of pixels of an object (image or screen) in the width direction and the height direction. For example, the image resolution of an image may be 1600 pixels×900 pixels, indicating that the number of pixels of the image in the width direction is 1600 and the number of pixels of the image in the height direction is 900.

Optionally, in an embodiment of this application, the target policy may be a display policy for the interface elements of the target interface that is predetermined by the developer of the target application, that is, a display policy prescribed by the developer. Certainly, in practice, the target policy may alternatively be a display policy for the interface elements of the target interface that is predefined by the developer of the electronic device. This may be determined according to an actual use requirement and is not limited in the embodiments of this application.

Optionally, in an embodiment of this application, a display parameter of the target screen is the same as the target screen capture parameter.

For example, assuming that the target screen capture parameter is 1600 pixels×900 pixels (that is, resolution), the screen resolution of the target screen is also 1600 pixels×900 pixels. This can ensure that a display parameter of the screen capture image obtained by performing a screen capture operation on the target screen is also the same as the target screen capture parameter, thereby ensuring that the display parameter of the screen capture image meets the screen capture needs of the user.

In an embodiment of this application, after receiving the screen capture input, the screen capture apparatus, in response to the screen capture input, can obtain the target screen capture parameter and the interface elements of the target interface, determine the target screen corresponding to the target screen capture parameter, and display the interface elements of the target interface on the target screen according to the target policy. In other words, the screen capture apparatus can adaptively display the interface elements of the target interface on the target screen according to the target policy and the display parameter of the target screen (that is, the target screen capture parameter).

Optionally, in an embodiment of this application, the screen capture apparatus can obtain the target policy through a package name of the target application and a name of the target interface. Which approach is used can be determined according to the actual use requirement and is not limited in the embodiments of this application.

Optionally, in an embodiment of this application, the target screen may be a virtual screen created based on the target screen capture parameter. Alternatively, the target screen may be a first area in the first screen of the electronic device, the first area corresponding to the target screen capture parameter. This may be determined according to an actual use requirement and is not limited in the embodiments of this application.

Optionally, in an embodiment of this application, the first screen may be a screen where the target interface is located before the screen capture input is received, or a screen other than the screen where the target interface is located before the screen capture input is received.

Which case is used can be determined according to the actual use requirement and is not limited in the embodiments of this application.

In an embodiment of this application, in the case that the target screen is a virtual screen, the screen capture apparatus displaying the interface elements of the target interface on the target screen according to the target policy is: the screen capture apparatus starts and runs the target interface on the virtual screen according to the target policy, and maps the interface elements of the target interface on the virtual screen to a visual area corresponding to the virtual screen. The visual area is an area in the screen of the electronic device, and the layout of the interface elements of the target interface in the visual area is the same as the layout of the interface elements of the target interface on the virtual screen.

Optionally, in an embodiment of this application, the shape of the visual area is the same as the shape of the virtual screen, and the size (or resolution) of the visual area may be the same as or different from the size (or resolution) of the virtual screen.

Figure 3:
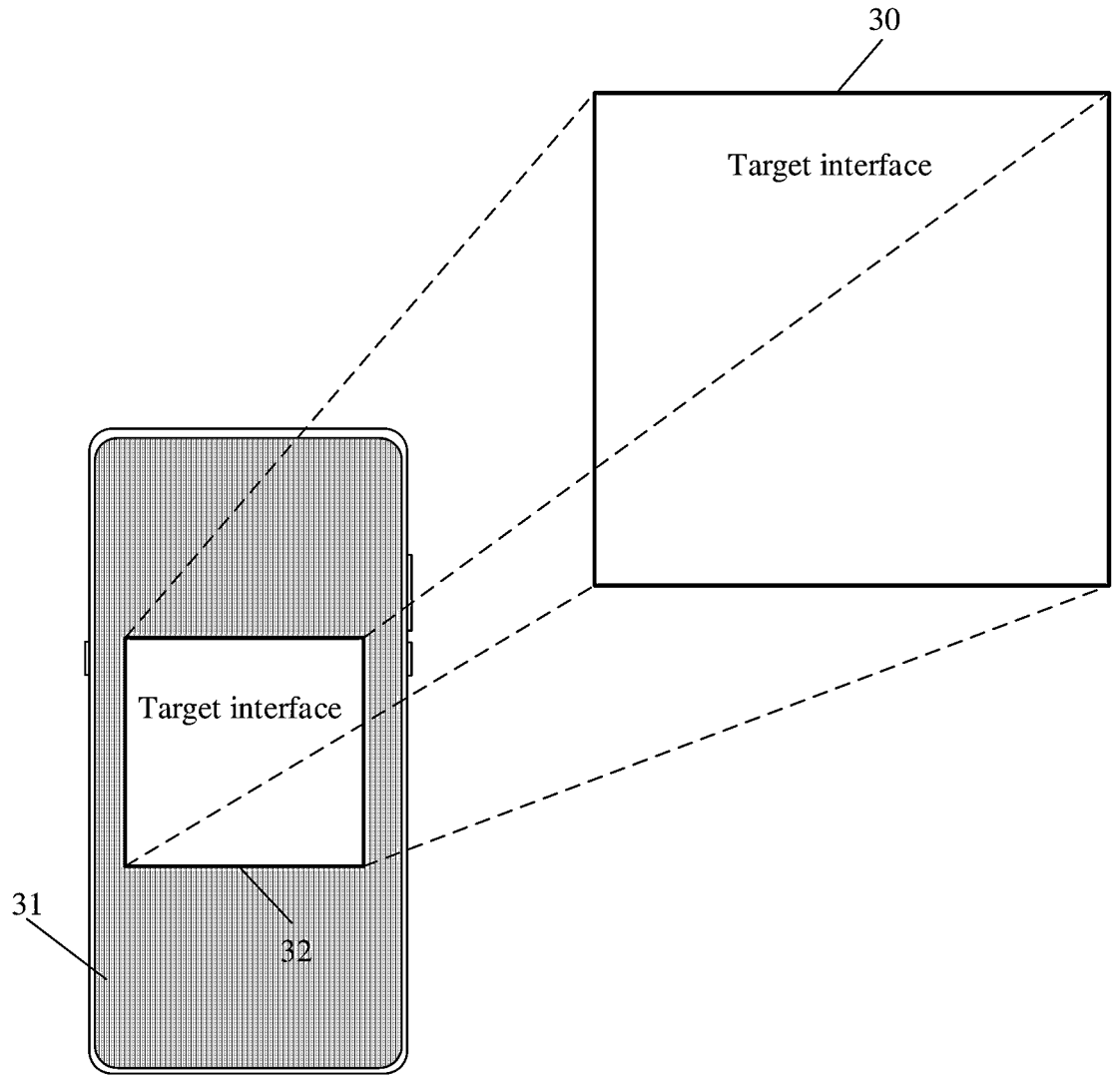
FIG. 3 is a first schematic diagram of an interface to which a screen capture method according to an embodiment of this application is applied.

For example, assuming that the target screen capture parameter is size and the size is 80 mm×80 mm, after the screen capture apparatus receives the screen capture input by the user for the target interface, as shown in FIG. 3, the screen capture apparatus can create a virtual screen 30 of size a mm×a mm, run the target interface on the virtual screen 30 according to the target policy, and map the interface elements of the target interface on the virtual screen 30 to a visual area 32 in one of screens 31 of the electronic device, the visual area 32 corresponding to the virtual screen, so the user can see the layout of the interface elements of the target interface on the virtual screen through the visual area. The visual area 32 may have a size of b mm×b mm, where both a and b are numbers greater than 0.

In this embodiment of this application, in the case that the target screen is the first area, the screen capture apparatus displaying the interface elements of the target interface on the target screen according to the target policy is: the screen capture apparatus displays a window on the first area of the first screen, and then displays the interface elements of the target interface in the window according to the target policy, where a display parameter of the window is the same as the display parameter of the first area, for example, the size of the window is the same as the size of the first area.

Optionally, in an embodiment of this application, the screen capture apparatus can display the interface elements of the target interface on the target screen according to a display priority; where the interface elements of the target interface may include a content element and a blank element, and a display priority of the content element is higher than a display priority of the blank element.

Figure 4A:
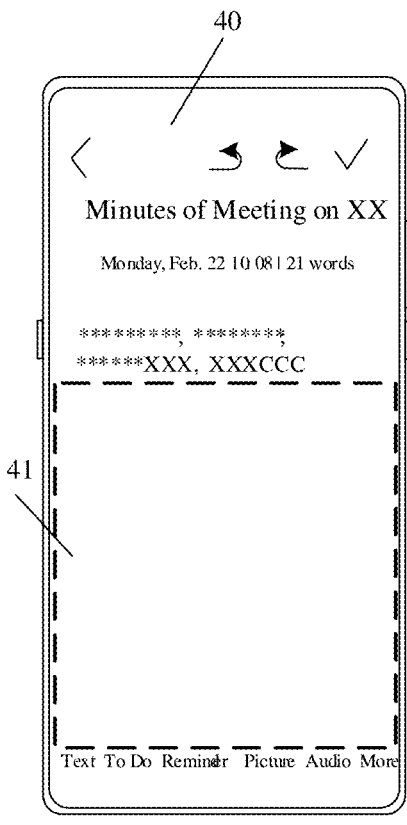
FIG. 4A is a second schematic diagram of an interface to which a screen capture method according to an embodiment of this application is applied.

For example, FIG. 4A is a schematic diagram of the target interface displayed by the screen capture apparatus before the screen capture input is received. As shown in FIG. 4A, the interface element "Minutes of Meeting on XX" in the target interface 40 is a content element, and the interface element in the area 41 of the target interface 40 is a blank interface element. It can be understood that the content element in the target interface is an interface element with content displayed in the target interface and the blank interface element in the target interface is an interface element with no content displayed.

Figure 4B:
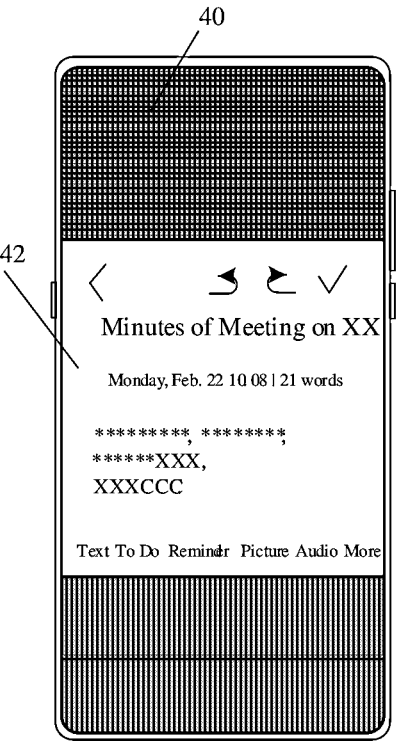
FIG. 4B is a third schematic diagram of an interface to which a screen capture method according to an embodiment of this application is applied.

The screen capture method provided in the embodiments of this application is exemplarily described below with reference to FIG. 4A and FIG. 4B.

For example, FIG. 4A is a schematic diagram of the target interface displayed on the first screen 40 of the electronic device before the screen capture apparatus receives the screen capture input. FIG. 4B is a schematic diagram of the target interface displayed on the target screen 42 after the screen capture apparatus receives the screen capture input. It can be seen from FIG. 4B that the size of the target screen 42 is smaller than the size of the first screen 40, and the target screen 42 gives priority to displaying the content element in the target interface and adaptively not displaying the blank element in the target interface, for example, not displaying the interface element in the area 41 of the target interface displayed on the first screen 40, so as to ensure that the effective content in the target interface is displayed to the maximum extent.

Step 103: The screen capture apparatus performs a screen capture operation on the target screen to obtain a first image.

A display parameter of the first image is the same as the target screen capture parameter.

In an embodiment of this application, the screen capture apparatus performs the screen capture operation on the target screen by capturing the entire display area of the target screen.

In the screen capture method provided in the embodiments of this application, when the user needs to obtain a screen capture image of a target interface, interface elements of the target interface can be displayed on a target screen corresponding to a screen capture parameter (size or resolution) specified by the user according to the target policy, and then the target screen can be captured to obtain a screen capture image of the target interface. Thus, it can be ensured that the screen capture image includes the content of the target interface and that the size/resolution of the screen capture image meets the screen capture needs of the user. In this way, compared with the technical solutions in the conventional technology that require adjustment operations such as stretching/compression on the screen capture image, the screen capture method provided in the embodiments of this application can avoid distortion of the content of the screen capture image, and thus can improve the display effect of the screen capture image.

The screen capture method provided in the embodiments of this application is described in two possible implementations.

One possible implementation

Optionally, in an embodiment of this application, the screen capture input may include a first sub-input and a second sub-input in one possible implementation. Before step 102, the screen capture method provided in the embodiments of this application may also include the following steps 104 and 105, and the foregoing step 102 may be implemented by the following step 102a.

Step 104: The screen capture apparatus displays, in response to the first sub-input by the user for the target interface, a parameter setting interface.

Step 105: The screen capture apparatus obtains, in response to the second sub-input by the user for the parameter setting interface, the target screen capture parameter corresponding to the second sub-input.

Step 102a: The screen capture apparatus determines the target screen corresponding to the target screen capture parameter and displays the interface elements of the target interface on the target screen according to the target policy.

For description of step 102a, reference may be made to the relevant description of the foregoing step 102. To avoid repetition, details are not described herein again.

In embodiments of this application, for different parameter setting interfaces, the screen capture apparatus may need to use different methods to obtain the target screen capture parameter.

In the following, three ways (way 1, way 2, and way 3) are used as examples to illustrate the method for obtaining the target screen capture parameter by the screen capture apparatus.

Way 1

Figure 5:
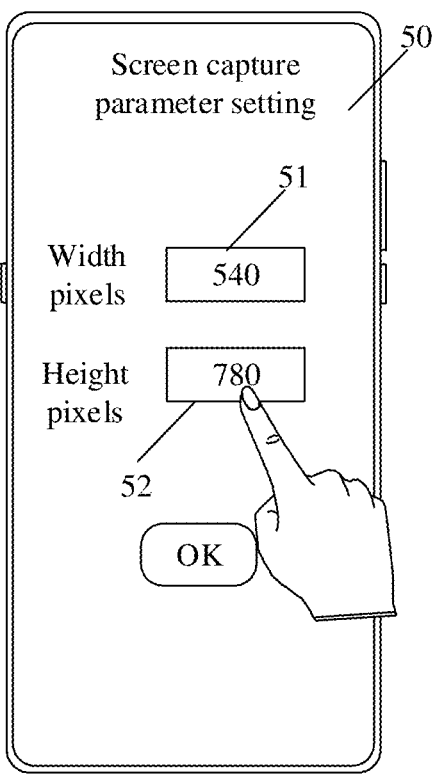
FIG. 5 is a fourth schematic diagram of an interface to which a screen capture method according to an embodiment of this application is applied.

Optionally, in an embodiment of this application, in way 1, as shown in FIG. 5, the parameter setting interface 50 may include a first input box 51 for inputting a pixel value in the width direction and a second input box 52 for inputting a pixel value in the height direction, and the user may input a width pixel value and a height pixel value in the first input box 51 and the second input box 52, respectively (in other words, the screen capture apparatus receives a second sub-input). The screen capture apparatus can obtain the width pixel value and height pixel value entered by the user and use them as target screen capture parameters.

Way 2

Figure 6:
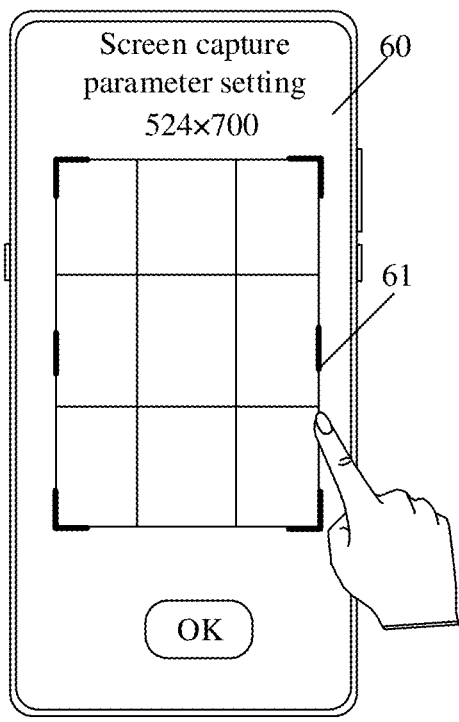
FIG. 6 is a fifth schematic diagram of an interface to which a screen capture method according to an embodiment of this application is applied.

Optionally, in an embodiment of this application, in way 2, as shown in FIG. 6, the parameter setting interface 60 may include a parameter setting box 61. The user may drag one border or one vertex of the parameter setting box 61 to trigger adjustment of the display parameter (resolution or size) of the parameter setting box 61. To be specific, the screen capture apparatus receives the second sub-input by the user for the parameter setting interface, so the screen capture apparatus may determine a display parameter of the updated parameter setting box as the target screen capture parameter in response to the second sub-input.

Way 3

Figure 7:
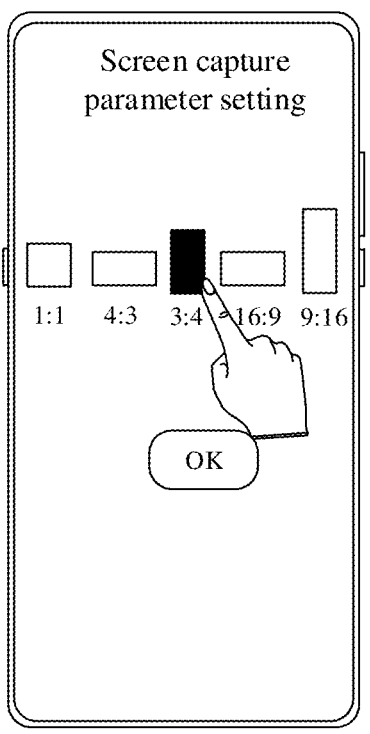
FIG. 7 is a sixth schematic diagram of an interface to which a screen capture method according to an embodiment of this application is applied.

Optionally, in an embodiment of this application, in way 3, the parameter setting interface may include multiple aspect ratio options, for example, as shown in FIG. 7, the parameter setting interface includes five aspect ratio options, namely, option 1:1, option 4:3, option 3:4, option 16:9, and option 9:16. The user may trigger the selection of any of the multiple aspect ratio options through the second sub-input; then the screen capture apparatus may calculate the target screen capture parameter based on the aspect ratio selected by the user (hereinafter referred to as the first aspect ratio) and the first parameter value. The first parameter value is any of the width, height, width pixel value, and height pixel value of the target interface before the screen capture apparatus receives the first sub-input.

For example, assuming that the first parameter value is the width pixel value (hereinafter referred to as pixel value 1) of the target interface before the screen capture apparatus receives the first sub-input and the target screen capture parameter is resolution, the width resolution of the target screen capture parameter may be pixel value 1, and the height resolution of the target screen capture parameter may be: pixel value 1÷first aspect ratio.

For another example, assuming that the first parameter value is the height pixel value (hereinafter referred to as pixel value 2) of the target interface before the screen capture apparatus receives the first sub-input and the target screen capture parameter is resolution, the height resolution of the target screen capture parameter may be pixel value 2, and the width resolution of the target screen capture parameter may be: pixel value 2×first aspect ratio.

Step 102c: The screen capture apparatus determines the target screen corresponding to the target screen capture parameter and displays the target interface on the target screen according to the target policy.

For description of the target screen, reference may be made to the relevant description of the target screen in the foregoing embodiment. To avoid repetition, details are not described herein again.

Optionally, in an embodiment of this application, in way 1, way 2, and way 3, the first sub-input may be a touch input by the user for the target interface or a screen capture control, a gesture input for triggering a screen capture, or an input through a key/key combination on the electronic device for triggering a screen capture. The screen capture input may be based on actual use requirements, and is not limited in the embodiments of this application.

It should be noted that in an embodiment of this application, the target screen may be a virtual screen or the first area mentioned above in a possible implementation.

In the embodiments of this application, the user can trigger the display parameter setting interface through the first sub-input and set the target screen capture parameter based on the second sub-input. Thus, it can be ensured that the target screen capture parameter meets the actual screen capture needs of the user and the first image obtained by performing the screen capture operation on the target screen can meet the screen capture needs of the user.

The other possible implementation

Optionally, in an embodiment of this application, the target screen is the first area of the first screen of the electronic device, the first area corresponding to the target screen capture parameter, and the screen capture input may include a third sub-input and a fourth sub-input. Before step 102, the screen capture method provided in the embodiments of this application may also include the following step 106, and the foregoing step 102 may be implemented by the following step 102b.

Step 106: The screen capture apparatus displays, in response to the third sub-input by the user for the target interface, interface elements of the target interface in a second area of the first screen according to the target policy.

Step 102b: The screen capture apparatus, in response to the fourth sub-input by the user for the second area, determines the second area as the first area, and adjusts a display parameter of the first area, and updates in a real-time display of the interface elements of the target interface in the first area according to the target policy.

In an embodiment of this application, the target screen capture parameter is the display parameter of the first area after the fourth input is ended.

In an embodiment of this application, after receiving the third sub-input, the screen capture apparatus can display a window in the second area of the first screen and display the target interface in the window according to the target policy; and then the user can drag one border or vertex of the window (that is, the fourth sub-input) to trigger the screen capture apparatus to determine the area where the window is located as the first area and adjust the display parameter of the window. In the process of adjusting the display parameter of the window, the screen capture apparatus can update the layout of the interface elements of the target interface in the window in real time based on a real-time display parameter of the window according to the target policy, so as to achieve a preview effect.

Figure 8A:
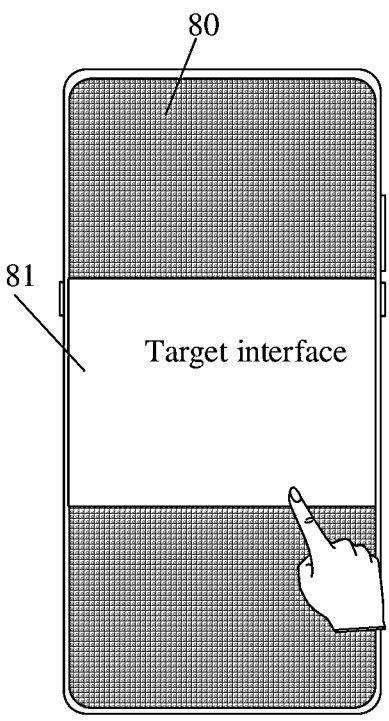
FIG. 8A is a seventh schematic diagram of an interface to which a screen capture method according to an embodiment of this application is applied.
Figure 8B:
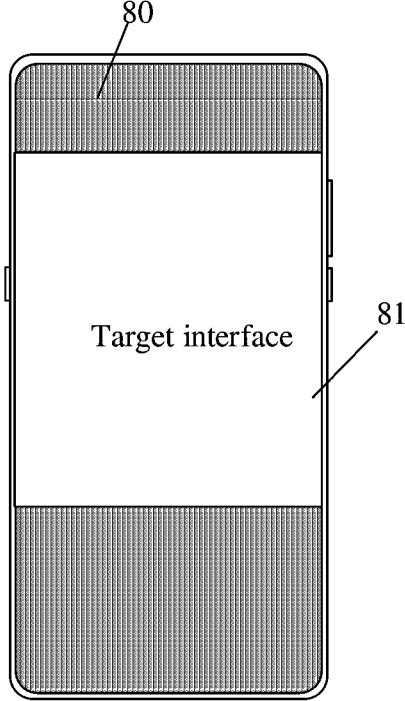
FIG. 8B is an eighth schematic diagram of an interface to which a screen capture method according to an embodiment of this application is applied.

For example, assuming that the target interface is displayed on the first screen of the electronic device and the user can make an input for the screen capture control (that is, the first sub-input), as shown in FIG. 8A, the screen capture apparatus can display a window 81 of a first size in the second area of the first screen 80 and display the target interface in the window according to the target policy; and then the user can drag the bottom side of the window 81 to trigger the screen capture apparatus to adjust the size of the window 81 from the first size shown in FIG. 8A to the second size shown in FIG. 8B. In the process of adjusting the size of the window 81, the screen capture apparatus can update the layout of the interface elements of the target interface in this window in real time based on the current size of this window 81 according to the target policy, so as to achieve a preview effect.

In this embodiment of this application, the user can trigger the display of the target interface in the second area of the first screen of the electronic device according to the target policy through the first sub-input, and trigger the determining of the second area as the first area through a dragging input for the second area (the fourth sub-input), and adjust the display parameter of the second area in real time to update the display of the target interface in the first area in real time. Thus, it can not only ensure that the first image obtained by performing the screen capture operation on the target screen meets the screen capture needs of the user, but also enable the user to preview the display effect of the target interface in real time. This can improve the human-machine interaction performance.

It should be noted that the screen capture method according to the embodiments of this application may be executed by a screen capture apparatus or a control module for executing the screen capture method in the screen capture apparatus. In embodiments of this application, the screen capture method being executed by a screen capture apparatus is used as an example to describe the screen capture method according to the embodiments of this application.

Figure 9:
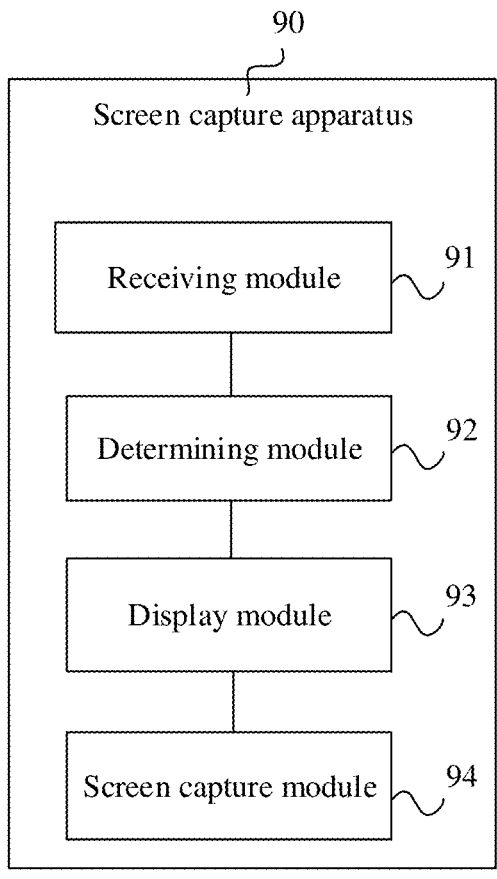
FIG. 9 is a schematic diagram of a screen capture apparatus according to an embodiment of this application.

As shown in FIG. 9, an embodiment of this application provides a screen capture apparatus 90, where the screen capture apparatus 90 may include a receiving module 91, a determining module 92, a display module 93, and a screen capture module 94. The receiving module 91 may be configured to receive a screen capture input for a target interface. The determining module 92 is configured to determine, in response to the screen capture input received by the receiving module 91, a target screen corresponding to a target screen capture parameter. The display module 93 is configured to display, according to a target policy, interface elements of the target interface on the target screen determined by the determining module 92, where the target screen capture parameter is determined according to the screen capture input, and the target policy is a preset display policy for the target interface. The screen capture module 94 is further configured to perform a screen capture operation on the target screen to obtain a first image; where the target screen capture parameter is resolution or size, and a display parameter of the first image is the same as the target screen capture parameter.

Optionally, in an embodiment of this application, the target screen may be a virtual screen created based on the target screen capture parameter, or the target screen is a first area of a first screen of an electronic device, the first area corresponding to the target screen capture parameter.

Optionally, in an embodiment of this application, the screen capture apparatus 90 may further include an obtaining module, where the screen capture input includes a first sub-input and a second sub-input. The display module 93 is further configured to display a parameter setting interface in response to the first sub-input for the target interface. The obtaining module is configured to obtain a target screen capture parameter corresponding to the second sub-input in response to the second sub-input for the parameter setting interface displayed by the display module 93.

Optionally, in an embodiment of this application, the target screen is the first area; and the screen capture input includes a third sub-input and a fourth sub-input. The apparatus further includes an adjustment module. The display module 93 is further configured to display the interface elements of the target interface in the second area of the first screen according to the target policy in response to the third sub-input for the target interface. The determining module is further configured to determine the second area as the first area in response to the fourth sub-input by the user for the second area. The adjustment module is configured to adjust the display parameter of the first area determined by the determining module. The display module 93 is configured to update display of the interface elements of the target interface in the first area in real time according to the target policy.

Optionally, in an embodiment of this application, the display module 93 is configured to display interface elements of the target interface on the target screen according to the display priority; where the interface elements of the target interface include a content element and a blank element, and a display priority of the content element is higher than a display priority of the blank element.

For the beneficial effects of the various implementations in the embodiments, reference may be made to the beneficial effects of the corresponding implementations in the forego-
ing method embodiments. To avoid repetition, details are not
repeated herein.

The screen capture apparatus in the embodiments of this
application may be an apparatus or a component, an inte-
grated circuit, or a chip in the electronic device. The screen
capture apparatus may be a mobile electronic device or a
non-mobile electronic device. For example, the mobile
electronic device may be a mobile phone, a tablet computer,
a notebook computer, a palmtop computer, a vehicle-
mounted electronic device, a wearable device, an ultra-
mobile personal computer (ultra-mobile personal computer,
UMPC), a netbook, or a personal digital assistant (personal
digital assistant, PDA), and the non-mobile electronic device
may be a network attached storage (Network Attached
Storage, NAS), a personal computer (personal computer,
PC), a television (television, TV), a teller machine, a self-
service machine, or the like. This is not specifically limited
in the embodiments of this application.

The screen capture apparatus in the embodiments of this
application may be an apparatus having an operating system.
The operating system may be an Android (Android) oper-
ating system, iOS operating system, or other possible oper-
ating system. This is not specifically limited in the embodi-
ments of this application.

The screen capture apparatus provided in the embodi-
ments of this application is capable of implementing various
processes that are implemented by the screen capture appa-
ratus in the method embodiments of FIG. 2 to FIG. 8B. To
avoid repetition, details are not described herein again.

Figure 10:
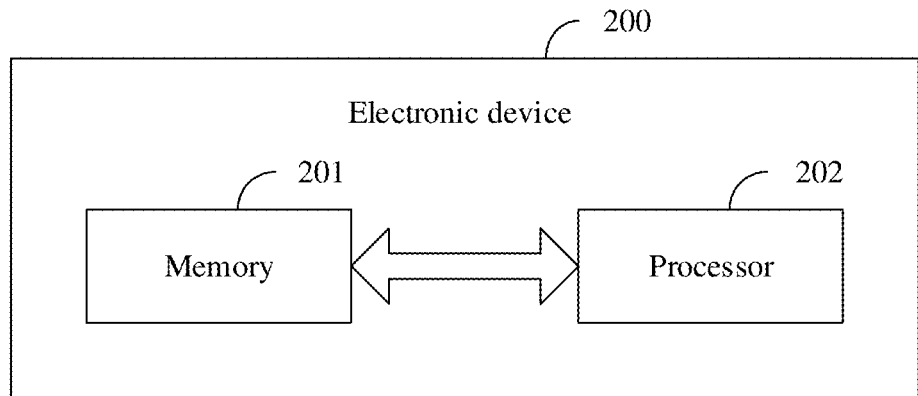
FIG. 10 is a schematic diagram of an electronic device according to an embodiment of this application.

As shown in FIG. 10, an embodiment of this application
further provides an electronic device 200, including a pro-
cessor 202, a memory 201, and a program or instructions
stored in the memory 201 and executable on the processor
202, where when the program or instructions are executed
by the processor 202, the processes of the foregoing screen
capture method embodiments are implemented, with the
same technical effects achieved. To avoid repetition, details
are not further described herein.

It should be noted that the electronic device in this
embodiment of this application includes the aforementioned
mobile electronic device and non-mobile electronic device.

Figure 11:
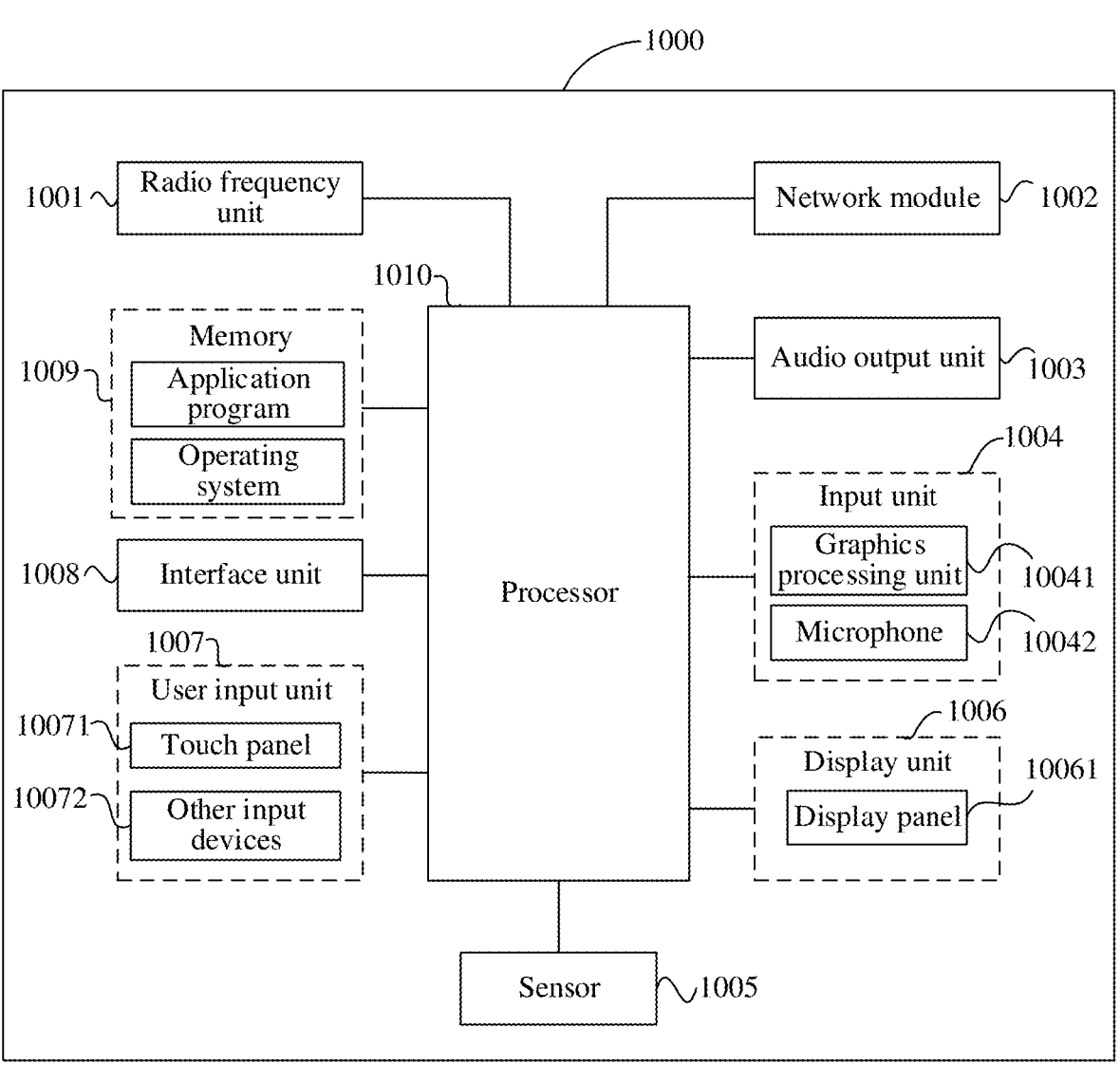
FIG. 11 is a schematic diagram of hardware of an electronic device according to an embodiment of this application.

FIG. 11 is a schematic diagram of a hardware structure of
an electronic device according to an embodiment of this
application.

The electronic device 1000 includes but is not limited to
components such as a radio frequency unit 1001, a network
module 1002, an audio output unit 1003, an input unit 1004,
a sensor 1005, a display unit 1006, a user input unit 1007,
an interface unit 1008, a memory 1009, and a processor
1010.

Those skilled in the art can understand that the electronic
device 1000 may further include a power supply (for
example, a battery) that supplies power to the components.
The power supply may be logically connected to the pro-
cessor 1010 through a power management system, so that
functions such as charge and discharge management and
power consumption management are implemented through
the power management system. The structure of the elec-
tronic device shown in FIG. 11 does not constitute a limi-
tation on the electronic device. The electronic device may
include more or fewer components than shown in the figure,
or combine some components, or have a different compo-
nent layout. Details are not described herein.

The user input unit 1007 may be configured to receive a
screen capture input for a target interface. The processor
1010 is configured to determine, in response to the screen capture input received by the user input unit 1007, a target
screen corresponding to a target screen capture parameter.
The display unit 1006 is configured to display, according to
a target policy, interface elements of the target interface on
the target screen determined by the processor 1010, where
the target screen capture parameter is determined according
to the screen capture input, and the target policy is a preset
display policy for the target interface. The processor 1010 is
further configured to perform a screen capture operation on
the target screen to obtain a first image; where the target
screen capture parameter is resolution or size, and a display
parameter of the first image is the same as the target screen
capture parameter.

Optionally, in an embodiment of this application, the
target screen may be a virtual screen created based on the
target screen capture parameter, or the target screen is a first
area of a first screen of an electronic device, the first area
corresponding to the target screen capture parameter.

Optionally, in an embodiment of this application, the
screen capture input may include a first sub-input and a
second sub-input. The display unit 1006 is further config-
ured to display a parameter setting interface in response to
the first sub-input for the target interface. The processor
1010 is configured to obtain a target screen capture param-
eter corresponding to the second sub-input in response to the
second sub-input for the parameter setting interface dis-
played by the display unit 1006.

Optionally, in an embodiment of this application, the
target screen is the first area; and the screen capture input
includes a third sub-input and a fourth sub-input. The
display unit 1006 is further configured to display the inter-
face elements of the target interface in the second area of the
first screen according to the target policy in response to the
third sub-input for the target interface. The processor 1010
is configured to determine the second area as the first area in
response to the fourth sub-input for the second area, and
adjust the display parameter of the first area. The display unit
1006 is configured to update display of the interface ele-
ments of the target interface in the first area in real time
according to the target policy.

Optionally, in an embodiment of this application, the
display unit 1006 is configured to display the interface
elements of the target interface on the target screen accord-
ing to a display priority; where the interface elements of the
target interface include a content element and a blank
element, and a display priority of the content element is
higher than a display priority of the blank element.

For the beneficial effects of the various implementations
in the embodiments, reference may be made to the beneficial
effects of the corresponding implementations in the forego-
ing method embodiments. To avoid repetition, details are not
repeated herein.

It should be understood that in an embodiment of this
application, the input unit 1004 may include a graphics
processing unit (Graphics Processing Unit, GPU) 10041 and
a microphone 10042. The graphics processing unit 10041
processes image data of a static picture or a video that is
obtained by an image capture apparatus (for example, a
camera) in a video capture mode or an image capture mode.
The display unit 1006 may include a display panel 10061.
The display panel 10061 may be configured in a form of a
liquid crystal display, an organic light-emitting diode dis-
play, or the like. The user input unit 1007 includes a touch
panel 10071 and other input devices 10072. The touch panel
10071 is also referred to as a touchscreen. The touch panel
10071 may include two parts: a touch detection apparatus
and a touch controller. The other input devices 10072 may include but are not limited to a physical keyboard, a function button (for example, a volume control button or a power on/off button), a trackball, a mouse, a joystick, and the like. Details are not described herein. The memory 1009 may be configured to store software programs and various data which include but are not limited to an application program and an operating system. The processor 1010 may integrate an application processor and a modem processor. The application processor mainly processes an operating system, a user interface, an application program, and the like. The modem processor mainly processes wireless communication. It can be understood that the modem processor may alternatively be not integrated in the processor 1010.

An embodiment of this application further provide a non-transitory readable storage medium, where the non-transitory readable storage medium stores a program or instructions, and when the program or instructions are executed by a processor, the processes of the foregoing screen capture method embodiments are implemented, with the same technical effect achieved. To avoid repetition, details are not described herein again.

The processor is the processor of the electronic device in the foregoing embodiment. The non-transitory readable storage medium includes a non-transitory computer-readable storage medium such as a computer read-only memory (Read-Only Memory, ROM), a random access memory (Random Access Memory, RAM), a magnetic disk, or an optical disc.

An embodiment of this application further provides a chip. The chip includes a processor and a communication interface. The communication interface is coupled to the processor. The processor is configured to run a program or instructions to implement the processes of the foregoing screen capture method embodiments, with the same technical effects achieved. To avoid repetition, details are not described herein again.

It should be understood that the chip in the embodiments of this application may also be referred to as a system-level chip, a system chip, a chip system, a system on chip, or the like.

It should be noted that in this specification, the terms "include" and "comprise", or any of their variants are intended to cover a non-exclusive inclusion, such that a process, method, article, or apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element. Furthermore, it should be noted that the scope of the methods and apparatuses in the embodiments of this application is not limited to performing the functions in the order shown or discussed, but may also include performing the functions in a substantially simultaneous manner or in a reverse order depending on the functions involved. For example, the described method may be performed in an order different from the order described, and steps may be added, omitted, or combined. In addition, features described with reference to some examples may be combined in other examples.

By means of the foregoing description of the implementations, persons skilled in the art may clearly understand that the method in the foregoing embodiment may be implemented by software with a necessary general hardware platform. Certainly, the method in the foregoing embodiment may also be implemented by hardware. However, in many cases, the former is a preferred implementation. Based on such an understanding, the technical solutions of this application essentially, or the part contributing to the prior art may be implemented in a form of a software product. The computer software product is stored in a non-transitory storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this application.

The foregoing describes the embodiments of this application with reference to the accompanying drawings. However, this application is not limited to the foregoing embodiments. The foregoing embodiments are merely illustrative rather than restrictive. As instructed by this application, persons of ordinary skill in the art may develop many other manners without departing from principles of this application and the protection scope of the claims, and all such manners fall within the protection scope of this application.

What is claimed is:

1. A screen capture method, wherein the method comprises:

receiving a screen capture input for a target interface;

in response to the screen capture input, determining a target screen corresponding to a target screen capture parameter and displaying interface elements of the target interface on the target screen according to a target policy, wherein the target screen capture parameter is determined according to the screen capture input, and the target policy is a preset display policy for the target interface; and performing a screen capture operation on the target screen to obtain a first image; wherein the target screen capture parameter is resolution or size, and a display parameter of the first image is the same as the target screen capture parameter;

wherein the displaying interface elements of the target interface on the target screen according to a target policy comprises:

displaying all content elements of the interface elements of the target interface on the target screen according to a display priority; wherein the interface elements of the target interface comprise a content element and a blank element, and a display priority of the content element is higher than a display priority of the blank element;

wherein the size of the target screen is smaller than the size of the target interface; and the target screen comprises a content element within a scope of the target screen and a content element which is not within the scope of the target screen of the target interface.

2. The method according to claim 1, wherein the target screen is a virtual screen created based on the target screen capture parameter, or the target screen is a first area in a first screen of an electronic device, the first area corresponding to the target screen capture parameter.

3. The method according to claim 2, wherein the screen capture input comprises a first sub-input and a second sub-input; and before the determining a target screen corresponding to a target screen capture parameter and displaying interface elements of the target interface on the target screen according to a target policy, the method further comprises:

displaying, in response to the first sub-input for the target interface, a parameter setting interface; and obtaining, in response to the second sub-input for the parameter setting interface, the target screen capture parameter corresponding to the second sub-input.

4. The method according to claim 2, wherein the target screen is the first area; and the screen capture input comprises a third sub-input and a fourth sub-input;

before the determining a target screen corresponding to a target screen capture parameter and displaying interface elements of the target interface on the target screen according to a target policy, the method further comprises:

displaying the interface elements of the target interface in a second area of the first screen according to the target policy in response to the third sub-input for the target interface; and the determining a target screen corresponding to a target screen capture parameter and displaying interface elements of the target interface on the target screen according to a target policy comprises:

in response to the fourth sub-input for the second area, determining the second area as the first area, and adjusting a display parameter of the first area, and updating in a real-time display of the interface elements of the target interface in the first area according to the target policy.

5. An electronic device, comprising a processor, a memory, and a program or instructions stored in the memory and executable on the processor, wherein the program or instructions, when executed by the processor, causes the electronic device to perform:

receiving a screen capture input for a target interface;

in response to the screen capture input, determining a target screen corresponding to a target screen capture parameter and displaying interface elements of the target interface on the target screen according to a target policy, wherein the target screen capture parameter is determined according to the screen capture input, and the target policy is a preset display policy for the target interface; and performing a screen capture operation on the target screen to obtain a first image; wherein the target screen capture parameter is resolution or size, and a display parameter of the first image is the same as the target screen capture parameter;

wherein the program or instructions, when executed by the processor, causes the electronic device to perform:

displaying all content elements of the interface elements of the target interface on the target screen according to a display priority; wherein the interface elements of the target interface comprise a content element and a blank element, and a display priority of the content element is higher than a display priority of the blank element;

wherein the size of the target screen is smaller than the size of the target interface; and the target screen comprises a content element within a scope of the target screen and a content element which is not within the scope of the target screen of the target interface.

6. The electronic device according to claim 5, wherein the target screen is a virtual screen created based on the target screen capture parameter, or the target screen is a first area in a first screen of the electronic device, the first area corresponding to the target screen capture parameter.

7. The electronic device according to claim 6, wherein the screen capture input comprises a first sub-input and a second sub-input; and the program or instructions, when executed by the processor, causes the electronic device to further perform:

displaying, in response to the first sub-input for the target interface, a parameter setting interface; and obtaining, in response to the second sub-input for the parameter setting interface, the target screen capture parameter corresponding to the second sub-input.

8. The electronic device according to claim 6, wherein the target screen is the first area; and the screen capture input comprises a third sub-input and a fourth sub-input; and the program or instructions, when executed by the processor, causes the electronic device to further perform:

displaying the interface elements of the target interface in a second area of the first screen according to the target policy in response to the third sub-input for the target interface; and the program or instructions, when executed by the processor, causes the electronic device to perform:

in response to the fourth sub-input for the second area, determining the second area as the first area, and adjusting a display parameter of the first area, and updating in a real-time display of the interface elements of the target interface in the first area according to the target policy.

9. A non-transitory readable storage medium, wherein the non-transitory readable storage medium stores a program or instructions, and when the program or instructions are executed by a processor of an electronic device, causes the electronic device to perform:

receiving a screen capture input for a target interface;

in response to the screen capture input, determining a target screen corresponding to a target screen capture parameter and displaying interface elements of the target interface on the target screen according to a target policy, wherein the target screen capture parameter is determined according to the screen capture input, and the target policy is a preset display policy for the target interface; and performing a screen capture operation on the target screen to obtain a first image; wherein the target screen capture parameter is resolution or size, and a display parameter of the first image is the same as the target screen capture parameter;

wherein the program or instructions, when executed by the processor, causes the electronic device to perform:

displaying all content elements of the interface elements of the target interface on the target screen according to a display priority; wherein the interface elements of the target interface comprise a content element and a blank element, and a display priority of the content element is higher than a display priority of the blank element;

wherein the size of the target screen is smaller than the size of the target interface; and the target screen comprises a content element within a scope of the target screen and a content element which is not within the scope of the target screen of the target interface.

10. The non-transitory readable storage medium according to claim 9, wherein the target screen is a virtual screen created based on the target screen capture parameter, or the target screen is a first area in a first screen of the electronic device, the first area corresponding to the target screen capture parameter.

11. The non-transitory readable storage medium according to claim 10, wherein the screen capture input comprises a first sub-input and a second sub-input; and the program or instructions, when executed by the processor, causes the electronic device to further perform:

displaying, in response to the first sub-input for the target interface, a parameter setting interface; and obtaining, in response to the second sub-input for the parameter setting interface, the target screen capture parameter corresponding to the second sub-input.

12. The non-transitory readable storage medium according to claim 10, wherein the target screen is the first area; and the screen capture input comprises a third sub-input and a fourth sub-input; and the program or instructions, when executed by the processor, causes the electronic device to further perform:

displaying the interface elements of the target interface in a second area of the first screen according to the target policy in response to the third sub-input for the target interface; and the program or instructions, when executed by the processor, causes the electronic device to perform:

in response to the fourth sub-input for the second area, determining the second area as the first area, and adjusting a display parameter of the first area, and updating in a real-time display of the interface elements of the target interface in the first area according to the target policy.

13. A chip, wherein the chip comprises a processor and a communication interface, wherein the communication interface is coupled to the processor, and the processor is configured to run a program or instructions to implement the screen capture method according to claim 1.

* * * * *